(12) United States Patent
Chou et al.

(10) Patent No.: US 8,934,058 B2
(45) Date of Patent: Jan. 13, 2015

(54) SIGNAL DIGITIZING SYSTEM AND METHOD BASED ON AMPLITUDE-TO-TIME OPTICAL MAPPING

(71) Applicants: Jason Chou, Walnut Creek, CA (US);
Corey V. Bennett, Livermore, CA (US);
Vince Hernandez, Brisbane, CA (US)

(72) Inventors: Jason Chou, Walnut Creek, CA (US);
Corey V. Bennett, Livermore, CA (US);
Vince Hernandez, Brisbane, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 14/092,763

(22) Filed: Nov. 27, 2013

(65) Prior Publication Data

US 2014/0146234 A1 May 29, 2014

Related U.S. Application Data

(60) Provisional application No. 61/730,913, filed on Nov. 28, 2012.

(51) Int. Cl.
| | |
|---|---|
| *H04N 5/14* | (2006.01) |
| *H04N 9/64* | (2006.01) |
| *H03M 1/00* | (2006.01) |
| *H04B 10/67* | (2013.01) |
| *H04B 10/69* | (2013.01) |

(52) U.S. Cl.
CPC ............... *H04B 10/67* (2013.01); *H04B 10/69* (2013.01)
USPC ............................ 348/571; 341/137; 398/184

(58) Field of Classification Search
CPC .......... H04N 13/0434; H04N 13/0438; H04N 13/0459; H04N 13/0497; H04N 5/14; H04N 5/20; H04N 5/21; H04N 5/44; G02B 27/26; H04B 10/67; H04B 10/69
See application file for complete search history.

(56) References Cited

U.S. PATENT DOCUMENTS

| | | | | |
|---|---|---|---|---|
| 6,100,831 | A * | 8/2000 | Frankel | 341/137 |
| 7,019,882 | B1 * | 3/2006 | Wilson | 359/265 |
| 2012/0148260 | A1 * | 6/2012 | Akiyama et al. | 398/184 |
| 2012/0321318 | A1 * | 12/2012 | Xu et al. | 398/76 |

OTHER PUBLICATIONS

Stewart, et al., "High Fidelity Neutron and Gamma RadSensor Detectors: A white paper exploring projected prefomance on HEDS experiments", v2.21 (Jul. 15, 2005).

(Continued)

*Primary Examiner* — Jefferey Harold
*Assistant Examiner* — Sean Haiem
(74) *Attorney, Agent, or Firm* — James S. Tak

(57) ABSTRACT

A signal digitizing system and method based on analog-to-time optical mapping, optically maps amplitude information of an analog signal of interest first into wavelength information using an amplitude tunable filter (ATF) to impress spectral changes induced by the amplitude of the analog signal onto a carrier signal, i.e. a train of optical pulses, and next from wavelength information to temporal information using a dispersive element so that temporal information representing the amplitude information is encoded in the time domain in the carrier signal. Optical-to-electrical conversion of the optical pulses into voltage waveforms and subsequently digitizing the voltage waveforms into a digital image enables the temporal information to be resolved and quantized in the time domain. The digital image may them be digital signal processed to digitally reconstruct the analog signal based on the temporal information with high fidelity.

10 Claims, 13 Drawing Sheets

(56) References Cited

OTHER PUBLICATIONS

Walden, "Analog-to-Digital Converter Survey and Analysis", HRL Laboratories, 46 pages, Jul. 16, 1999.

Juodawlkis, et al "Optically Sampled Analog-to-Digital Converters", IEEE Transactions on Microwave Theory and Techniques, vol. 49, No. 10, 14 pages (Oct. 2001).

Valley, "Photonic analog-to-digital converters", Optics Express, vol. 15, No. 5, 28 pages. (Mar. 5, 2007).

* cited by examiner

SIGNAL DIGITIZING SYSTEM AND METHOD BASED ON AMPLITUDE-TO-TIME OPTICAL MAPPING

FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

TECHNICAL FIELD

This patent document relates to signal processing, and in particular to a signal digitizing system and method based on amplitude-to-time optical mapping for high resolution digitization of analog signals.

BACKGROUND

The importance of and need for high speed and high resolution recording instrumentation is well known. Furthermore, electronic analog-to-digital converters (ADC) are known to sample and perform quantization in the amplitude domain (i.e. quantization of amplitude information) which places a tremendous burden on amplitude precision and fidelity. However, measurement precision in the amplitude domain can be limited by the amplitude resolution of the quantizer. Furthermore, ADCs are known to exhibit several noise sources inherent to the quantization process, including thermal noise, sampling aperture jitter, and comparator ambiguity. Electronic sampling jitter in particular can cause the amplitude noise of an ADC to increase with input frequency, limiting their usefulness in high speed and high precision applications. These effects combine to limit the overall performance of the recorder, i.e. effective number of bits (ENOB), which is exacerbated at higher speeds. For example, a fast 20 GS/s commercially available oscilloscope can provide about ~32 resolvable levels across a 10 GHz bandwidth, which may be insufficient for many applications, such as for example, wideband communication, remote sensing, and scientific research. Electron gun/tube-based oscilloscopes and streak cameras offer high dynamic range but have very limited record length and will not produce single-shot measurements at high repetition rates or for continuous data.

Various photonic methods for improving the performance of ADCs using amplitude quantization are known. For example, photonic time-stretch ADC operates by slowing down RF signals so they can be digitized with higher resolution, low bandwidth ADCs. While the time-stretch approach works well to achieve bandwidth reduction and reduce noise, the technique can introduce unwanted distortions that limit performance. For example, in the time domain, the sinusoidal (Mach-Zehnder) MZ transfer function requires linearization. In the frequency domain, chromatic dispersion induced fading requires compensation. To increase the record length, individual time segments require high fidelity stitching. And time warps in the stretched RF signal can be induced by wavelength dependent bias offsets of the MZ modulator, higher order dispersion terms in the optical fiber, and wavelength dependent group delay variation in the wavelength division multiplexers (WDMs). Each of these distortions can add complexity and limit the overall resolution of the system.

Another method known as optically-sampled ADCs performs sampling in the optical domain and amplitude quantization in the electronic domain. This technique overcomes the electronic jitter noise of ADCs due to superior jitter properties of mode-locked lasers and the use of optical sampling. However, accurate digitization is not assured because other imperfections, such as for example noise from photodetectors, RF amplifiers, laser amplitude fluctuations, and individual electronic ADCs as well as nonlinear distortions from the MZ modulator, photodetectors, and RF amplifiers, can potentially limit the system's performance.

SUMMARY

One aspect of the present invention includes a signal digitizing system based on analog-to-time optical mapping, comprising: an optical pulse source for producing a train of optical pulses; an amplitude tunable filter (ATF) adapted to optically map the amplitude information of the analog signal to wavelength information by impressing on the train of optical pulses spectral changes induced by the amplitude information of the analog signal; a dispersive element adapted to optically map the wavelength information to temporal information by broadening the train of optical pulses in the time domain received from the ATF to produce a train of optical pulses encoded with the temporal information in the time domain; an optical-to-electrical converter adapted to convert the train of optical pulses from the dispersive element to a train of electrical waveforms encoded with the temporal information in the time domain; an analog-to-digital converter (ADC) adapted to digitize the train of electrical waveforms from the optical-to-electrical converter into a digital image and resolve the temporal information in the time domain; and a digital signal processor (DSP) for digital signal processing the digital image using the resolved temporal information to produce a digital reconstruction of the analog signal.

Another aspect of the present invention includes a method of digitizing an analog signal based on analog-to-time optical mapping, comprising: converting an analog signal into a train of amplitude-to-time optically mapped analog waveforms each encoded with temporal information representing amplitude information of the analog signal; digitizing the train of temporal information-encoded analog waveforms into a digital image to resolve the temporal information in the time domain; and digital signal processing the digital image using the resolved temporal information and the period of the train to produce a digital reconstruction of the analog signal.

These and other implementations and various features and operations are described in greater detail in the drawings, the description and the claims.

The present invention is generally directed to a signal digitizing system and method for quantizing an analog signal (e.g. electronic, optical, X-ray, high energy particle, pressure, temperature, or other physical phenomena) in the time domain using time-based/temporal information (e.g. timing shifts, delays, intervals, etc.) converted from amplitude information of the analog signal, and not in the amplitude domain using amplitude information directly as seen in conventional ADCs/digitizers.

In particular, the present invention first optically maps amplitude information of the signal into temporal information, which process may be characterized as amplitude-to-time optical mapping or "ATOM", generally performed in two steps. First, amplitude-to-wavelength conversion is performed using, for example, an amplitude-tunable filter (ATF) arranged to receive an analog input signal as well as a periodic, aperiodic, or time-limited train/series of broadband optical pulses (e.g. having a period/sampling interval, T) from an optical pulse source. The optical pulse source may be, for example, a mode-locked laser or optical comb source, which offer ultra-low noise jitter and greatly reduce the sampling noise limitation found in electronic ADC sampling processes. And the ATF functions to map amplitude to wavelength by inducing spectral changes (e.g. wavelength shifts Δλ, bandwidth changes, frequency profile changes, etc.) in the optical pulses as a function of the input signal's amplitude. Because amplitude is mapped first to wavelength, and then wavelength mapped to time, the ATOM process may also be characterized in the alternative as an amplitude-to-wavelength-to-time optical mapping process.

Various types of ATFs may be used in the present invention. For example, for RF applications a fiber optic filter, such as a modified Sagnac loop with optical phase modulator shown in FIG. 3 may be used. For X-ray or high energy particle applications, another embodiment of the ATF is a Rad-Optical Sensor, as described in "*High Fidelity neutron and Gamma RadSensor Detectors: A White Paper Exploring Projected Performance on HEDS Experiments*" by Rick Steward et al, incorporated by reference herein in its entirety. This implementation creates a direct relationship between absorbed radiation and phase change within a Fabry-Perot cavity. The electron-hole pairs formed through absorption induce a shift the resonant frequency of the cavity. Other Rad-Optic Sensors based on Mach-Zehnder interferometry and diffraction have been demonstrated. GTI, polarization rotation, and other senor embodiments could also be used to produce the ATF. For optical applications, another example embodiment of the ATF is an optical filter which changes its spectral properties as a function of the input optical intensity. For example, a tunable birefringence comb filter based on a Sagnac loop interferometer may be used to induce spectral shifts through optical modulation. And for environmental sensing applications, such as for example pressure and temperature sensing, another example embodiment of the ATF is an optical filter which changes its spectral properties as a function of the desired measurement. For example, fiber Bragg grating and birefringent filter based sensors are extremely sensitive to environmental properties, e.g. pressure and temperature. When these sensors are used as the ATF, the invention can potentially achieve high speed and high resolution recording, not possible with conventional amplitude based recorders.)

The second step of the ATOM process involves wavelength-to-time conversion using, for example, a dispersive element (e.g. chromatic optical fiber, fiber Bragg gratings, free-space grating pairs, etc.) arranged to receive the train of wavelength information-encoded optical pulses from the ATF and map wavelength to time by converting the spectral changes into temporal changes encoded in the time domain in the optical pulses. In this manner, the ATOM process produces a train of optical pulses encoded with temporal information representing amplitude information of the input signal. The temporal information-encoded train of optical pulses from the dispersive element is then converted by, for example, an optical-to-electrical converter, into a train of electrical (e.g. voltage) waveforms encoded with the temporal changes, for use in the next digitization step. It is appreciated that ultrafast lasers and optoelectronic components may be used for the optical pulse source and optical-to-electrical converter, respectively, which have orders of magnitude more bandwidth than all electronic components. As such, unlike all-electronic methods to achieve amplitude-to-time conversion, the present invention is uniquely suited for broadband (>100 GHz) input signals.

The train of temporal information-encoded voltage waveforms are then digitized with, for example, an analog-to-digital converter (ADC), so that quantization of the analog waveform (by the ADC) resolves the temporal information in the time domain. It is notable that the ADC may be a high speed (i.e. high temporal resolution) electronic ADC (e.g. >1 GHz). Such ADCs often exhibit low resolution (M resolution levels) in the amplitude domain but high resolution (N resolution levels; N>M) in the time domain. Thus, by converting amplitude information of the analog signal into temporal information for quantization in the time domain, where relatively high levels of temporal resolution are exhibited by ADCs/digitizers, the signal digitizing system and method of the present invention is capable of producing higher resolution digital output than which might be produced by a conventional ADC alone that is based on amplitude-domain quantization. It is appreciated that, optionally, the temporal information-encoded analog waveform may be recorded as an analog recording (e.g. after the optical-to-electrical converter) or digital recording (e.g. after the ADC), in conventional analog or digital storage media known in the art.

After the analog-to-digital conversion, the digital signal output from the ADC is then passed to a digital signal processor (DSP), e.g. field programmable gate arrays (FPGAs), or other digital signal processing hardware, software, or firmware, to map the temporal information back to the amplitude domain by quantifying the time shifts associated with each pulse and digitally reconstructing the analog signal from the temporal information embedded in the ADC digital signal output.

Certain embodiments of the system and method of the present invention may also incorporate a process using multi-period processing to resolve the ambiguity created by the use of periodic ATFs, and to achieve one-to-one mapping and increased resolution, even over multiple periods. Multi-period processing generally involves the addition of a single period digitization path in parallel with the multi-period digitization path having the ambiguity caused by two or more periods. In the multi-period path each period is quantized using N levels. And in the single period path, the analog signal is attenuated prior to optically mapping over one period by the ATOM process. In this manner, the single period path removes the ambiguity of the periodic amplitude-to-time mapping by distinguishing between the periods of the input signal. A digital signal processor is used to combine the information from the single- and multi-period paths and uses the multi-periods to process the periodic mapping and achieve double (or higher) resolution for the high resolution digital output.

Certain embodiments of the system and method of the present invention may also incorporate a process for time de-multiplexing which prevents signals from overlapping during the ATOM process in order to achieve higher resolution (increasing the dynamic range of the embodiment), larger optical sampling rates (e.g. Nyquist and above), and/or continuous time operation (for continuous signals) by utilizing channelization before and/or after the ATF. In one realization, continuous time operation can be achieved by splitting the optical pulse source after the ATF into M channels, each operating at 1/M the original repetition rate of the laser (1/T), and finally recorded by a bank of M ADCs. In another realization, large resolution can be achieved on a time limited signal by picking N pulses from the pulse train prior to the ATF. Following the ATF, these N pulses are split into M channels, each containing integer multiples of delay N*T, and then combined to create a concatenated train of M*N pulses on a single channel. This train is then pulse picked by a factor of M to produce a train of N pulses each separated by a delay greater than N*T. Consequently, higher resolution recording can be achieved since the delay between pulses has increased from the original period (T). And in another realization, channelization can be performed to increase the sample rate of pulses entering the ATF to allow faster sampling of an input signal. Channelization can be performed using time-domain multiplexing (TDM) or wavelength division multiplexing (WDM). In the former, the original repetition rate of the laser is multiplied by a factor of M through a series of splitters, delays, and combiners. In the later, the pulse bandwidth may be separated into M wavelength channels, delayed, and recombined to form a train of pulses with a higher repetition rate of M/T. The advantage of the later is that a passive wavelength splitter element can be used after the ATF to both channelize and increase the delay between pulses-thereby increasing the resolution. It is notable that any combination of the above realizations for channelization may be used to increase the overall resolution, sample rate, and time aperture of the embodiment to satisfy a wide range of design requirements.

For certain applications, it may be advantageous to place one or more functional components of the present invention in a remote location, or to otherwise group or separate the functional components as unit modules. For example, it is appreciated that each functional component shown in the figures may be separated over long distances using a combination of fiber-optic, free-space, wired, and/or wireless links. For example, it may be cost-effective to share a single optical pulse source with multiple ATOM digitizers. The optical pulses could be split, amplified, and/or transported over long distances through optical fiber and/or free space before entering multiple ATFs. In other applications, it may be important to place the ATF as close as possible to an antenna to help minimize electromagnetic interference at the analog input and allow the remaining components to be powered in an area with less concern for interference. In other applications, such as communication links, it may be useful to distribute the electronic ADC and/or DSP components over a wireless network. For example, cellular receivers may use time-based encoding to provide encryption, power, size, weight, and/or cost saving advantages. In another example, the system of the present invention may be realized as a stand-alone recording instrument for electronic signals, or a front end to an existing oscilloscope or digitization product.

In this manner, the system and method of the present invention may achieve high dynamic range, wideband, continuous time digitization beyond the performance conventional oscilloscopes and digitizers. Low-cost compact fiber-optic components along with high sample rate ADCs may be utilized. The system and method of the present invention may be deployed in wireless communications networks based on time domain quantization, e.g. pulse position modulation (PPM), or may be used at the transmitter of a base station to broadcast signals in the time-domain to mobile receivers using lower power time-based ADCs. The system/method may also be used for high speed and/or high dynamic range sensors for measuring pressure, velocity, temperatures and range. For example, an ATF may be embodied as a fiber Bragg grating sensor, which may be recorded and quantized using amplitude-to-time conversion described in this invention. If RadSensors are used as an ATF, this invention may increase the dynamic range, resolution, and signal to noise ratio of conventional instrumentation (such an oscilloscope or streak camera).

DETAILED DESCRIPTION

Figure 1:
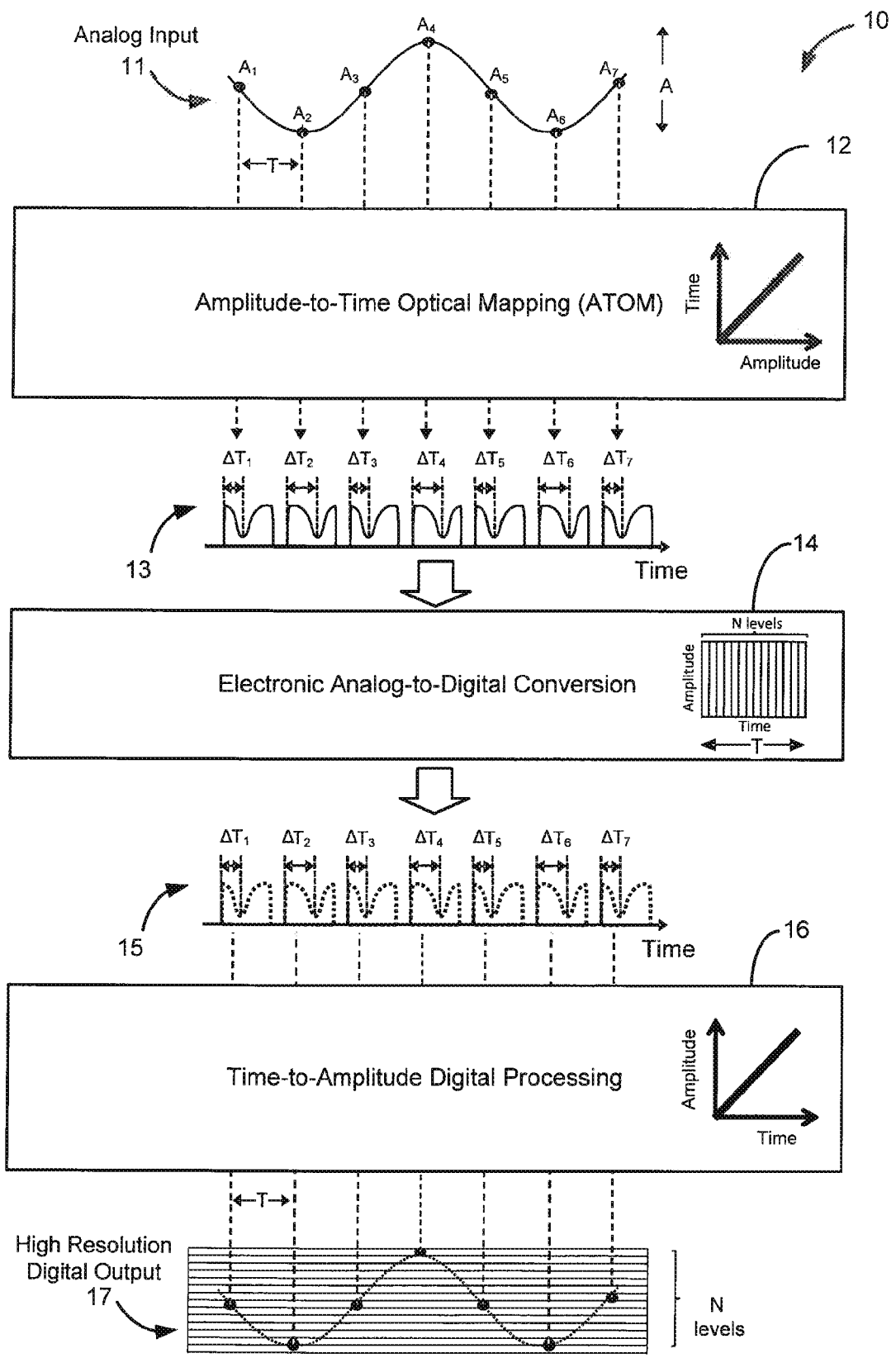
FIG. 1 is schematic flow chart illustrating an example embodiment of the digitizing method of the present invention, for quantizing an analog input signal with an amplitude of A at a sampling interval of T with enhanced resolution.

Turning now to the drawings, FIG. 1 illustrates a generalized example embodiment of the digitizing method of the present invention indicated at 10 for quantizing an analog input signal of interest 11 (shown having amplitude range A) with enhanced resolution. The method may be generally characterized as comprising three functional processes: (1) amplitude-to-time optical mapping or ATOM process indicated at 12, followed by (2) electronic analog-to-digital conversion indicated at 14, and concluding with (3) time-to-amplitude digital processing indicated at 16. First, the ATOM process 12 operates to optically map amplitude information, $A_N$, of the input signal 11 to temporal information, e.g. time shifts $\Delta T_N$, carried by/encoded in a train of analog waveforms 13 shown spaced apart at a sampling interval, T, where N represents the sample number. While not shown in FIG. 1, the ATOM process may be further characterized as a two part process involving: first optically mapping the amplitude information into wavelength information (e.g. using an ATF to induce spectral changes in the train of analog waveforms as a function of the input signal's amplitude), followed by optically mapping the wavelength information into the temporal information (e.g. using a dispersive element). Next, electronic analog-to-digital conversion is performed at 14 using an electronic ADC, e.g. a high speed ADC having sufficient time resolution, to quantize the train of analog waveforms 13 into digital output 15. Notably, quantization of the train of analog waveform resolves the encoded temporal information in the time domain and at the time-resolution levels (e.g. N levels) of the electronic ADC, which as described in the Summary can be much higher than its resolution in the amplitude domain. A final time-to-amplitude digital processing step is then performed at 16 using for example a digital signal processor (DSP) to quantize the precise temporal shifts in the digitized output 15 and map the temporal information back to the amplitude domain with high fidelity. In particular, the highly resolved temporal information is analyzed by the DSP to digitally reconstruct the analog signal as the high resolution digital output 17, shown in FIG. 1 resolved to N levels of amplitude resolution.

Figure 2:
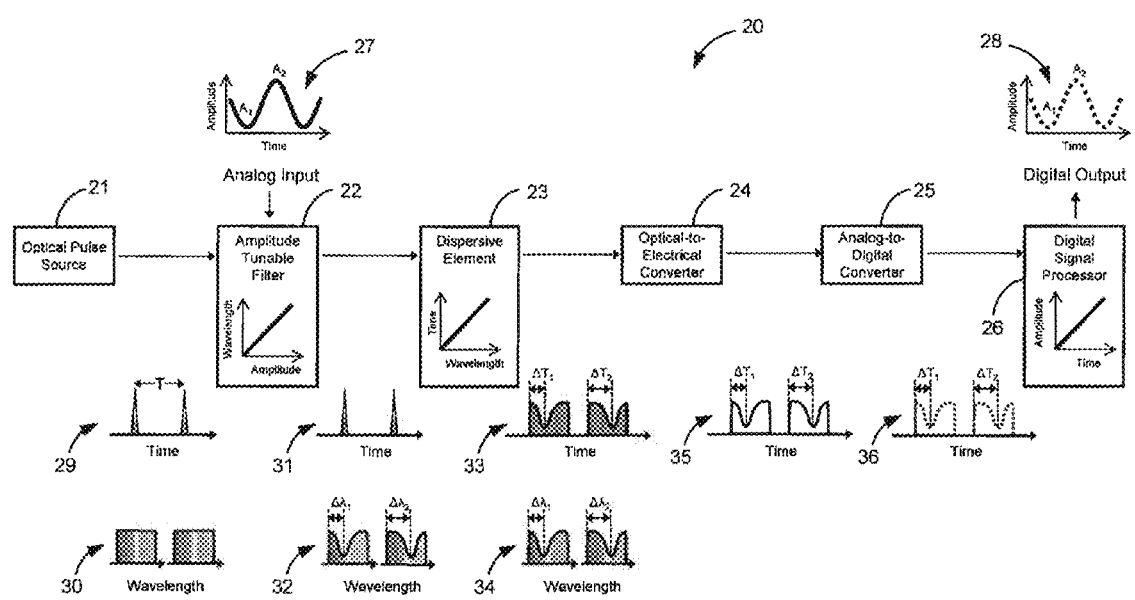
FIG. 2 is a schematic view of an example embodiment of a signal digitizing system of the present invention illustrating the signal evolution through the system.

FIG. 2 shows an example embodiment of the signal digitizing system of the present invention, generally indicated at reference character 20. In particular, the system 20 is shown comprising an optical pulse source 21 for producing a periodic, aperiodic, or time-limited train/series of broadband optical pulses (29 showing two representative time-domain waveforms, and 30 showing the corresponding spectral waveforms), an ATF 22 for producing spectral changes in the optical pulses proportional to an analog input signal 27, a dispersive element 23 for mapping wavelength to time to produce a train/series of temporal information-encoded optical pulses, an optical-to-electrical converter 24 to convert from optical to electrical waveforms, an analog-to-digital converter (ADC) 25 to digitize the electrical waveforms, and a digital signal processor (DSP) 16 for processing the digital dispersed time-domain waveforms into a high resolution digital output.

As shown in FIG. 2, the train of broadband optical pulses from the optical pulse source is passed through the ATF. The analog input signal of interest is also received as input to the ATF with the amplitude of the signal of interest inducing changes to the filter characteristics of the ATF, so that each optical pulse passing through the ATF captures the spectral changes associated with the amplitude of the input signal at different moments in time (represented by $\Delta\lambda_1$ and $\Delta\lambda_2$). As shown at 31 and 32, while the analog waveforms 31 of the optical pulses have not changed, the spectral waveforms 32 show the spectral changes $\Delta\lambda_1$ and $\Delta\lambda_2$ induced by the input signal's amplitude. This is amplitude-to-wavelength mapping, where the amplitude information of the input signal 11 is first mapped to wavelength information carried by the train of analog waveforms. Following the ATF, the train of optical pulses passes through the dispersive element which broadens the pulse in the time domain and maps spectral information shown at 34 into temporal information, represented by $\Delta T_1$ and $\Delta T_2$ and shown at 33 carried by/encoded in the analog waveform, i.e. the train of optical pulses.

Next, the train of temporal information-encoded optical pulses 33 are then converted into an electronic (e.g. voltage) signal 35 using for example the optical-to-electrical converter, which may be in the form of for example, a photodiode or optical detector. This conversion step may be considered a last part of the ATOM process or a first part of the analog-to-digital conversion process. As shown, the train of optical waveforms 33 and the train of electrical waveforms 35 both have the temporal information in the time domain to be resolvable by the ADC in the next step.

The train of temporal information-encoded voltage waveforms 35 are then digitized with, for example, an analog-to-digital converter (ADC), to produce a digital image 36, and so that quantization of the analog waveform (by the ADC) resolves the temporal information in the time domain. It is notable that the ADC may be a high speed (i.e. high temporal resolution) electronic ADC (e.g. >1 GHz). Such ADCs often exhibit low resolution (M resolution levels) in the amplitude domain but high resolution (N resolution levels; N>M) in the time domain. Thus, by converting amplitude information of the analog signal into temporal information for quantization in the time domain, where relatively high levels of temporal resolution are exhibited by ADCs/digitizers, the signal digitizing system and method of the present invention is capable of producing higher resolution digital output than which might be produced by a conventional ADC alone that is based on amplitude-domain quantization. It is appreciated that, optionally, the temporal information-encoded analog waveform may be recorded as an analog recording (e.g. after the optical-to-electrical converter) or digital recording (e.g. after the ADC), in conventional analog or digital storage media known in the art.

After the analog-to-digital conversion, the digital signal output from the ADC is then passed to a digital signal processor (DSP), e.g. field programmable gate arrays (FPGAs), or other digital signal processing hardware, software, or firmware, to map the temporal information back to the amplitude domain by quantifying the time shifts associated with each pulse and digitally reconstructing the temporal information embedded in the ADC digital signal output, as digital output 28.

Figure 3:
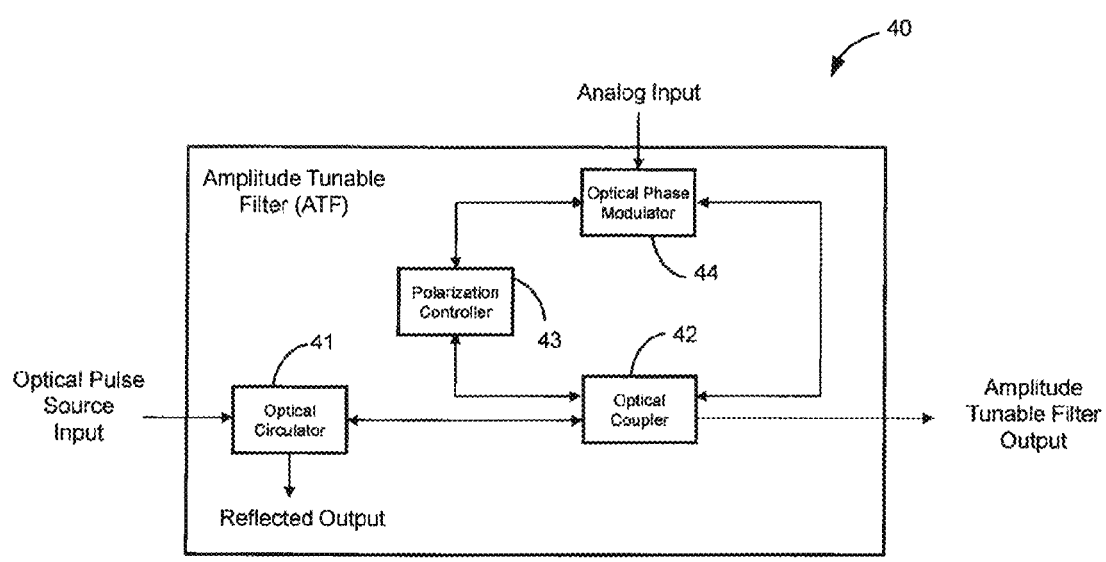
FIG. 3 is a schematic view of an example amplitude tunable filter (ATF) used in an example embodiment of the digitizing system of the present invention, and in particular a modified Sagnac filter having an optical phase modulator incorporated therein to receive an analog input.
Figure 4:
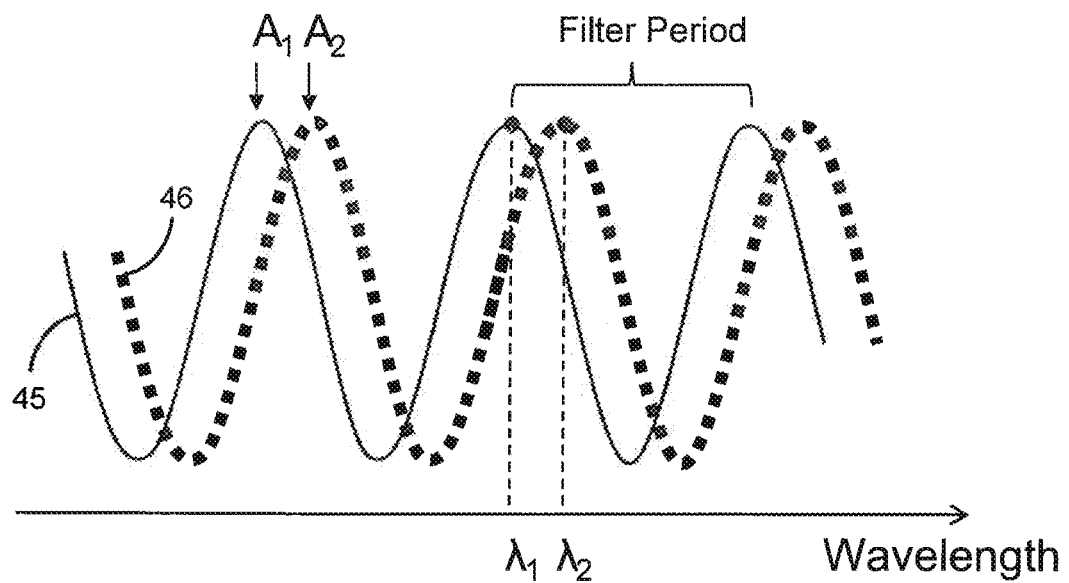
FIG. 4 is a graph of an example spectral waveform illustrating the spectral shifts caused by a periodic amplitude tunable filter.
Figure 5:
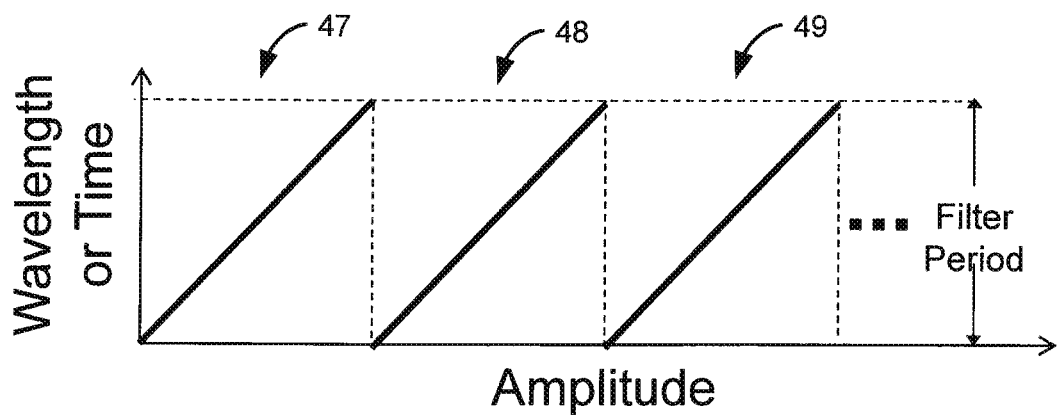
FIG. 5 is a graph illustrating the wrapped amplitude-to-wavelength mapping caused by a periodic amplitude tunable filter. Following the dispersive element, the result can also be represented as a wrapped amplitude-to-time mapping.

FIG. 3 shows an example type of ATF that may be used in the signal digitizing system of the present invention for use in RF applications. In particular, the ATF is an optical filter, generally indicated at 40 that is based on a fiber optic Sagnac loop comprising an optical circulator 41, an optical coupler 42, a polarization controller 43, and an electro-optic phase modulator 44. This type of ATF creates a highly linear mapping between input voltage and output wavelength shift. For example, the Sagnac loop may consist of a ~≥1 nm/V with electrically tuned birefringence. The phase modulator 44 is advantageous over amplitude modulation because it eliminates the nonlinear sinusoidal transfer function and makes high fidelity measurements possible. FIG. 4 illustrates the spectral profile of a Sagnac loop tuned by the electro-optic phase modulator 44 shown in FIG. 3 receiving the analog input signal. The transfer function 45 is periodic with wavelength and the spectral profile is linearly shifted in wavelength (e.g. to 46) with respect to an input voltage from the analog input signal. The filter's period is determined by the amount of birefringence found in the fiber within the loop and can be changed, for example, based on the length of fiber within the loop. FIG. 5 shows how the periodic spectral profile translates into a wrapped amplitude-to-wavelength mapping, such as shown at 47-49. When the input voltage shifts the filter profile exactly one period, the mapping wraps in wavelength as the amplitude spans multiple filter periods, so that the spectrum looks identical to a zero voltage input, creating an ambiguity as to amplitude. Following the dispersive element, the result can also be represented as being wrapped in time as the amplitude spans multiple filter periods.

Figure 6:
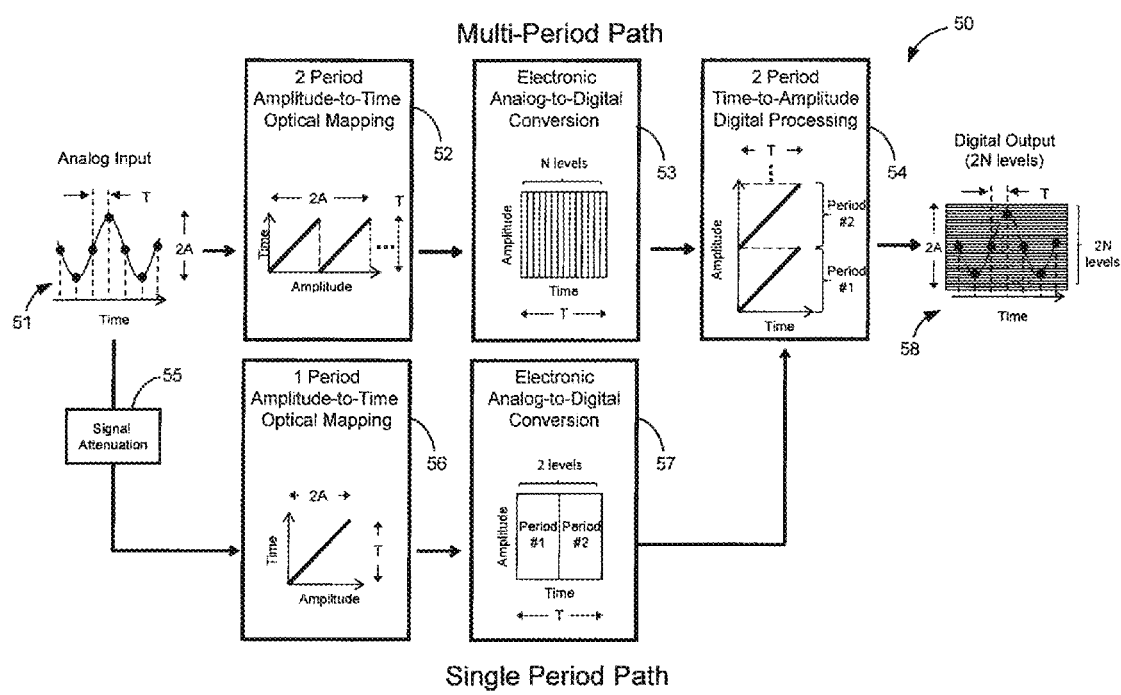
FIG. 6 is a schematic flow chart illustrating another example embodiment of the digitizing method of the present invention using multi-period processing to further enhance resolution when a periodic amplitude tunable filter is used, so as to achieve one-to-one mapping over multiple periods. In particular, a two-period processing scheme is shown used to increase the final resolution from N (1-period scheme) to 2N (two-period scheme).

FIG. 6 generally shows an example embodiment of a signal digitizing method 50 to resolve the amplitude ambiguity due to the use of a periodic ATF, such as the modified Sagnac loop with optical phase modulator of FIG. 3, to achieve unambiguous one-to-one mapping and increased resolution, even over multiple periods, through multi-period processing. In particular FIG. 6 illustrates how the addition of a single period digitization path (e.g. 55-57) in parallel with the multi-period digitization path (e.g. 52-53) can be used to effectively double the resolution level from N to 2N levels. The ambiguous multi-period path is shown spanning over two periods where each period is quantized using N levels. In particular analog input signal 51 is shown optically mapped over the two periods by the ATOM process at 52, and analog-to-digitally converted at 53 to quantize using N levels. The single period path is shown with the analog input signal 51 attenuated at 55 prior to optically mapping over one period by the ATOM process at 56, followed by analog-to-digital conversion at 57. The single period path removes the ambiguity of the periodic amplitude-to-time mapping by distinguishing the bottom (period #1) and top (period #2) halves of the input signal. A digital signal processing algorithm at 54 combines the information from the single- and multi-period paths and uses the multi-periods to process the periodic mapping and achieve a resolution of 2N levels for the high resolution digital output 58.

Figure 7:
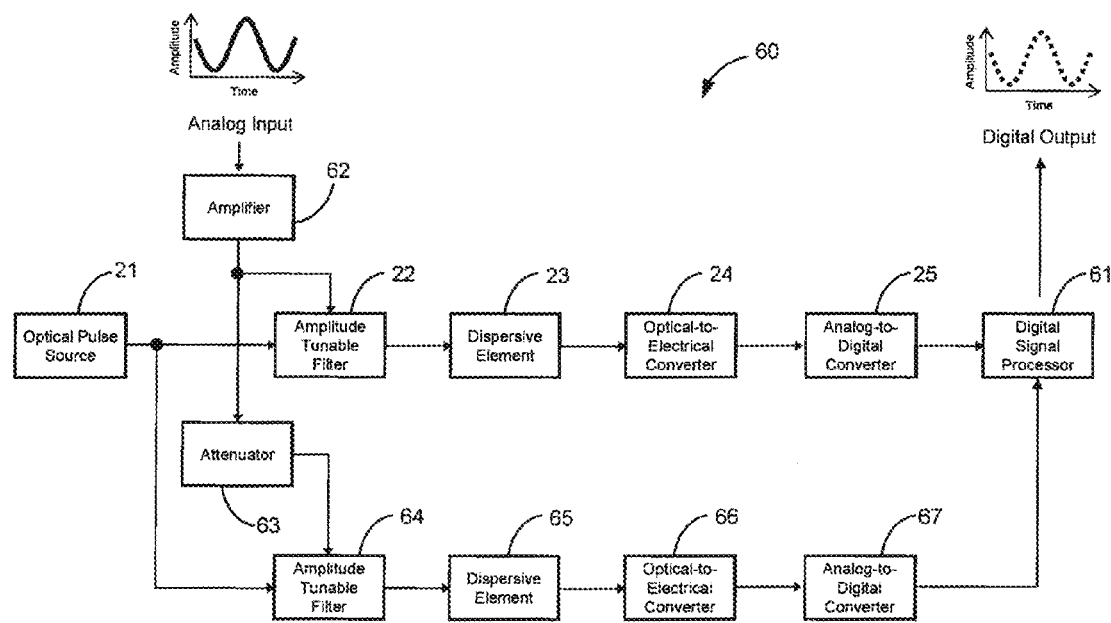
FIG. 7 is a schematic view of an example embodiment of the signal digitizing system of the present invention using multi-period processing, and particularly arranged to use a single optical pulse source for both the multi-period and single period paths.

FIG. 7 shows a first example embodiment of the system of the present invention 60 using the multi-period processing of FIG. 6 to create further resolution enhancement. The analog input is shown amplified by amplifier 62 and split along two parallel paths: a multi-period path which includes ATF 22 (e.g. a periodic ATF), dispersive element 23, optical-to-electrical converter 24, and analog-to digital converter 25, and a single period path which includes attenuator 63, ATF 64, dispersive element 65, optical-to-electrical converter 66, and analog-to-digital converter 67. For both the single- and multi-period paths the same optical pulse source 21 is used to provide the train of optical pulses. In the multi-period path, the signal 62 is amplified in order to span across multiple ATF filter periods. By doing so, the number of resolvable levels is multiplied; however, those levels are also ambiguously mapped. To process, i.e. "unwrap," the amplitude-to-time optical mapping, the single period path attenuates the signal such that it does not exceed one filter period and does not exhibit ambiguity. Other methods may exist in order to limit the signal range to one filter period, e.g. using a less-sensitive phase modulator. Thus, the combination of both multi-period and single period paths at the digital signal processor 61 is used to create an unambiguous mapping between amplitude and wavelength.

Figure 8:
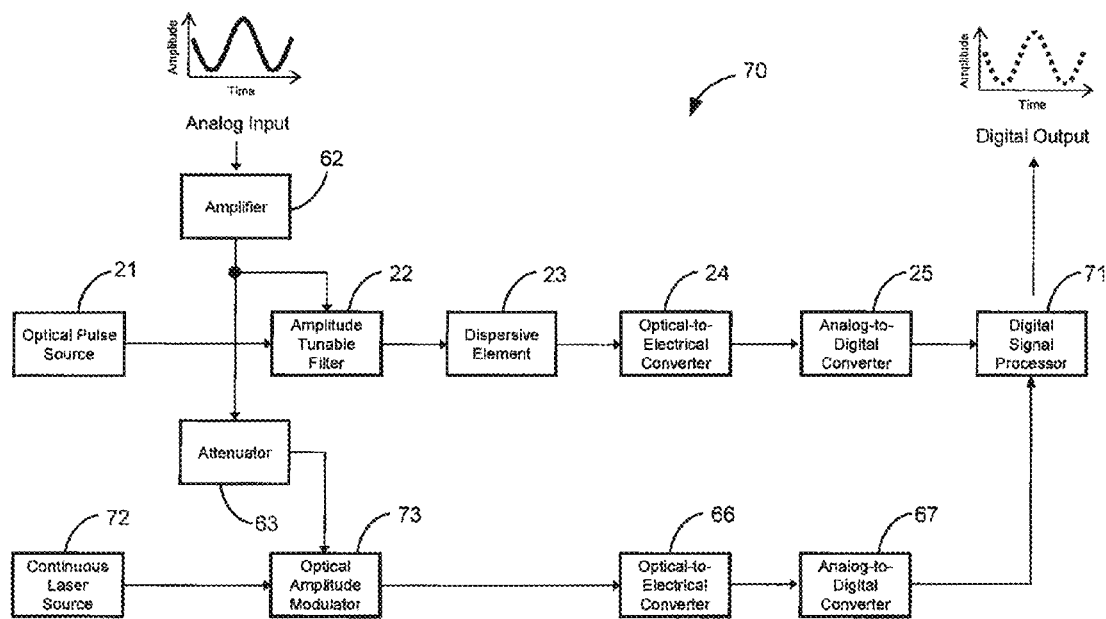
FIG. 8 is a schematic view of another example embodiment of the signal digitizing system of the present invention using multi-period processing, and particularly arranged to use a continuous laser for the single period path.

FIG. 8 shows a second example embodiment of the system 70 of the present invention using the multi-period processing of FIG. 6 to create further resolution enhancement. The analog input is shown amplified by amplifier 62 and split along two parallel digitization paths: similar to FIG. 7, the multi-period path includes ATF 22 (e.g. a periodic ATF), dispersive element 23, optical-to-electrical converter 24, and ADC 25.

However, in the single period path the amplified signal is first attenuated at attenuator 63 and directed to an optical amplitude modulator 73 which imprints the attenuated analog input onto a continuous wave laser, produced by a continuous laser source 72, followed by optical-to-electrical conversion by optical-to-electrical converter 66, and subsequently digitized with a low resolution electronic ADC 67. Other methods may exist in order to limit the signal range to one filter period, e.g. using a less-sensitive amplitude modulator 73. The digital output from ADCs 25 and 67 are combined at digital signal processor 71.

Figure 9:
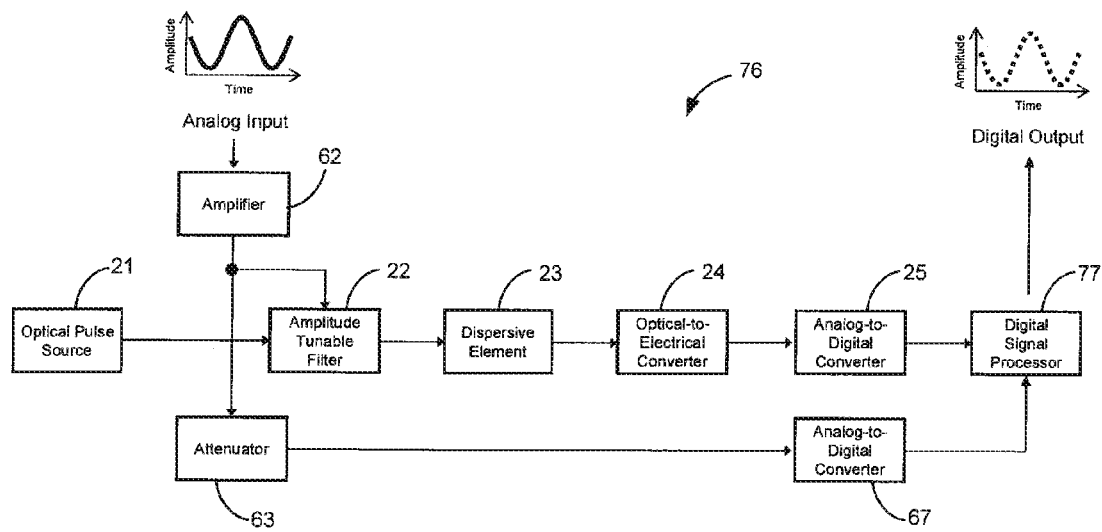
FIG. 9 is a schematic view of another example embodiment of the signal digitizing system of the present invention using multi-period processing, and particularly arranged to perform direct analog-to-digital conversion in the single period path.

FIG. 9 shows a second example embodiment of the system 70 of the present invention using the multi-period processing of FIG. 6 to create further resolution enhancement. The analog input is shown amplified by amplifier 62 and split along two parallel digitization paths: similar to FIGS. 7 and 8, the multi-period path includes ATF 22 (e.g. a periodic ATF), dispersive element 23, optical-to-electrical converter 24, and ADC 25. However, in the single period path the amplified signal is first attenuated at attenuator 63 and directed to an electronic ADC 67 which simply measures the input amplitude directly in the electrical domain and does not require any additional optical components. Other methods may exist in order to limit the signal range to one filter period, e.g. using a higher dynamic range electronic ADC 73. As in FIGS. 7 and 8, the two paths are combined at DSP 77 to produce the high resolution digital reconstruction of the analog input signal.

Figure 10:
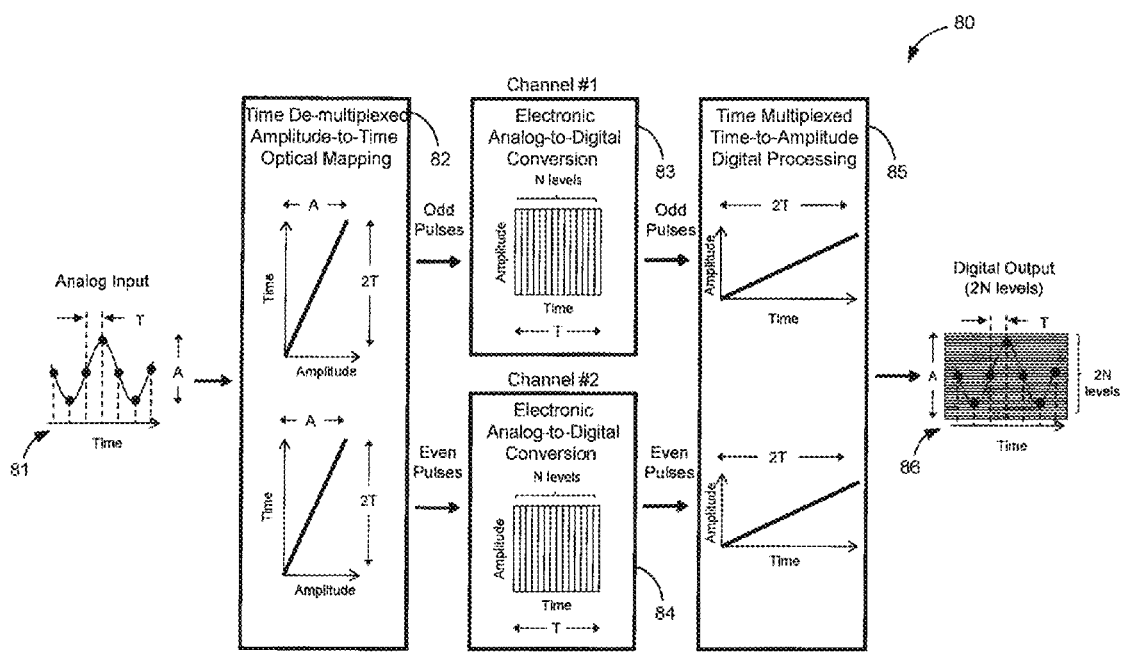
FIG. 10 is a schematic flow chart illustrating another example embodiment of the digitizing method of the present invention for further enhancing resolution by time de-multiplexing the amplitude-to-time mapping process. In particular, a two channel scheme is shown to increase the final resolution from N to 2N.

FIG. 10 shows a schematic flow chart illustrating another example embodiment of the digitizing method of the present invention for further enhancing resolution by time de-multiplexing the amplitude-to-time optical mapping process. In particular, FIG. 10 shows a two channel time de-multiplexing process for effectively doubles the resolution levels from N to 2N for any given optical sampling rate. An analog input signal 81 is shown time de-multiplexed at 82 to two channels so as to be dispersed over 2T seconds. Channel #1 is shown at 83 for digitizing odd pulses with a first ADC at N levels resolution, and channel #2 shown at 84 for digitizing even pulses with a second ADC also at N levels resolution. A final digital signal processing step at 85 performs time-to-amplitude mapping as well as interleaving of the two channels (i.e. time multiplexing) to reconstruct the sampled analog signal at period T, as digital output 86 resolved at 2N levels. While FIG. 10 particularly shows a two channel time de-multiplexing process, any number of channels may be produced in the time de-multiplexing process with each channel using a separate electronic ADC.

Figure 11:
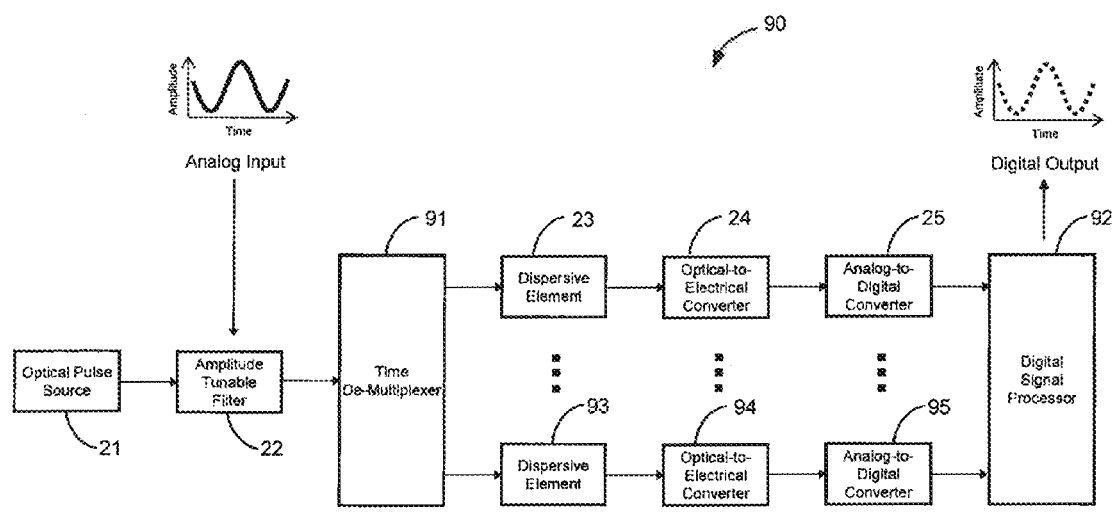
FIG. 11 is a schematic view of an example embodiment of the signal digitizing system of the present invention using a time de-multiplexor to time de-multiplex the amplitude-to-time mapping process into any number of multiple channels.

FIG. 11 shows a first example embodiment of the digitizing system of the present invention for further enhancing resolution by time de-multiplexing the amplitude-to-time optical mapping process. As shown, an optical pulse source 21 is provided to direct a train of optical pulses into ATF 22 so that spectral changes are induced as a function of the amplitude of an analog signal input, as previously described. The period T of the train of optical pulses is then deserialized into Z channels at time de-multiplexor 91, such as a $1^{st}$ channel shown comprising dispersive element 23, optical-to-electrical converter 24, and ADC 25, and a $Z^{th}$ channel comprising dispersive element 93, optical-to-electrical converter 94, and ADC 95. The time de-multiplexor 81 increases the period in each channel to Z*T. By doing so, the number of resolvable levels can be multiplied by Z. For continuous time input applications, time de-multiplexing requires Z electronic ADCs to absorb the total throughput. After the electronic ADC, a digital signal processor 92 is shown which combines all Z channels and performs digital time interleaving to reconstruct the original sampling period T. It is appreciated that for noncontinuous or time-limited input applications a single electronic ADC channel may be used to achieve further resolution enhancement by (a) time de-multiplexing the signal, (b) increasing the period in each channel, (c) delaying each channel, and (d) time multiplexing all channels back into a single electronic ADC.

Figure 12:
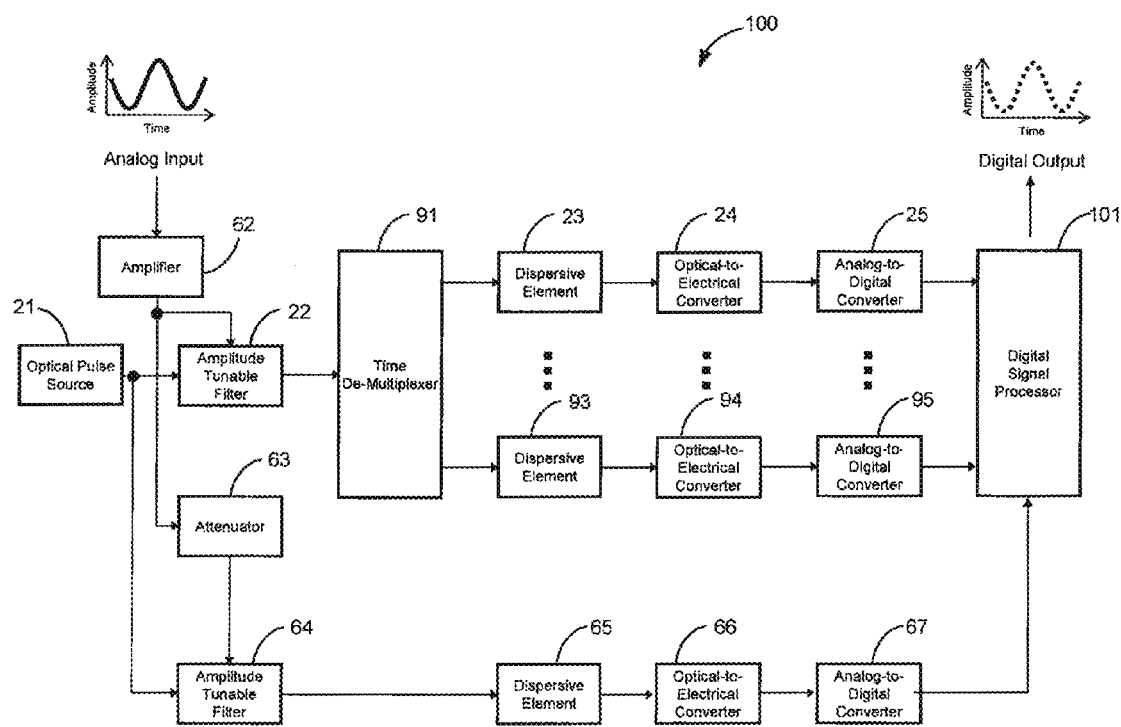
FIG. 12 is a schematic view of another example embodiment of the signal digitizing system of the present invention using both a time de-multiplexor and a multi-period processing scheme, and particularly arranged to use a single optical pulse source for both the multi-period and single period paths.
Figure 13:
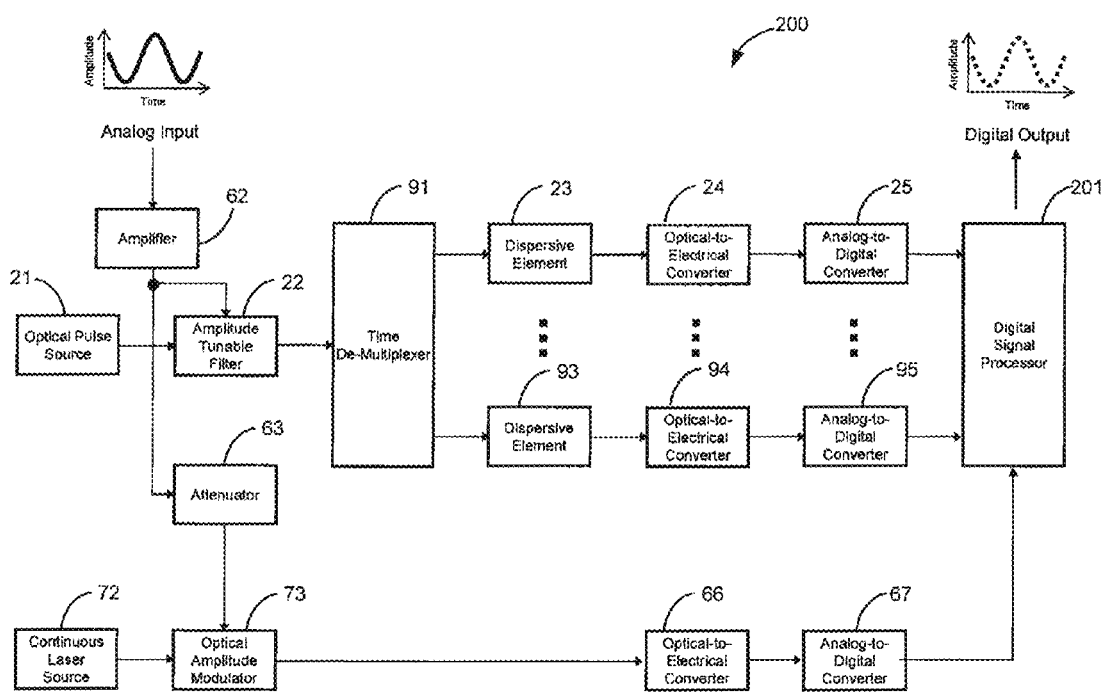
FIG. 13 is a flow chart of an embodiment of the present invention using both a time de-multiplexor and a multi-period processing scheme, and particularly arranged to use a continuous laser for the single period path.
Figure 14:
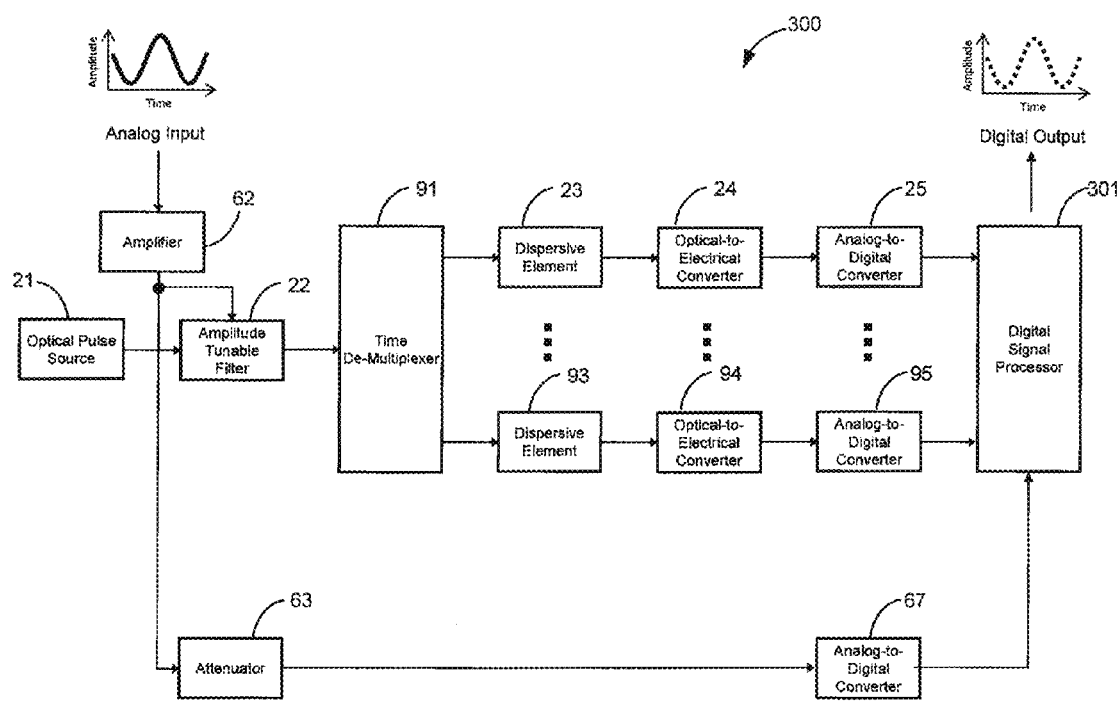
FIG. 14 is a flow chart of an embodiment of the present invention using both a time de-multiplexor and a multi-period processing scheme, and particularly arranged to perform direct analog-to-digital conversion in the single period path.

FIGS. 12-14 further show hybrid digitizing systems combining multi-period processing and time de-multiplexing in order to further enhance resolution and unambiguous amplitude-to-time mapping. It is appreciated that any combination of Y multi-periods and Z channels may be used to achieve a desired resolution enhancement for a given sample rate T.

In particular FIG. 12 shows a hybrid of the approaches shown in FIGS. 7 and 11. Similar to the multi-period processing scheme of FIG. 7, the analog input is shown amplified by amplifier 62 and split along two parallel paths: a single period path which includes attenuator 63, ATF 64, dispersive element 65, optical-to-electrical converter 66, and analog-to-digital converter 67, and a multi-period path which includes ATF 22 (e.g. a periodic ATF) and a time de-multiplexing scheme similar to FIG. 11. In particular, from the ATF 22, the period T of the train of optical pulses is then deserialized into Z channels at time de-multiplexor 91, such as a $1^{st}$ channel shown comprising dispersive element 23, optical-to-electrical converter 24, and ADC 25, and a $Z^{th}$ channel comprising dispersive element 93, optical-to-electrical converter 94, and ADC 95. For both the single- and multi-period paths the same optical pulse source 21 is used to provide the train of optical pulses. The digital signal processor 101 then combines the multi-period and single period paths (including all the Z channels of the multi-period path) to create an unambiguous, time-interleaved mapping between amplitude and wavelength.

And FIG. 13 shows a hybrid of the approaches shown in FIGS. 8 and 11. Similar to the multi-period processing scheme of FIG. 8, the analog input is shown amplified by amplifier 62 and split along two parallel paths: a single period path which includes attenuator 63, continuous laser source 72, optical amplitude modulator 73, optical-to-electrical converter 66, and analog-to-digital converter 67, and a multi-period path which includes ATF 22 (e.g. aperiodic ATF) and a time de-multiplexing scheme similar to FIG. 11. In particular, from the ATF 22, the period T of the train of optical pulses is then deserialized into Z channels at time de-multiplexor 91, such as a $1^{st}$ channel shown comprising dispersive element 23, optical-to-electrical converter 24, and ADC 25, and a $Z^{th}$ channel comprising dispersive element 93, optical-to-electrical converter 94, and ADC 95. The digital signal processor 201 then combines the multi-period and single period paths (including all the Z channels of the multi-period path) to create an unambiguous, time-interleaved mapping between amplitude and wavelength.

And FIG. 14 shows a hybrid of the approaches shown in FIGS. 9 and 11. Similar to the multi-period processing scheme of FIG. 9, the analog input is shown amplified by amplifier 62 and split along two parallel paths: a single period path which includes attenuator 63, and analog-to-digital converter 67, and a multi-period path which includes ATF 22 (e.g. a periodic ATF) and a time de-multiplexing scheme similar to FIG. 11. In particular, from the ATF 22, the period T of the train of optical pulses is then deserialized into Z channels at time de-multiplexor 91, such as a $1^{st}$ channel shown comprising dispersive element 23, optical-to-electrical converter 24, and ADC 25, and a $Z^{th}$ channel comprising dispersive element 93, optical-to-electrical converter 94, and ADC 95. The digital signal processor 301 then combines the multi-period and single period paths (including all the Z channels of the multi-period path) to create an unambiguous, time-interleaved mapping between amplitude and wavelength.

Although the description above contains many details and specifics, these should not be construed as limiting the scope of the invention or of what may be claimed, but as merely providing illustrations of some of the presently preferred embodiments of this invention. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present invention, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

We claim:

1. A signal digitizing system based on analog-to-time optical mapping, comprising:
   an optical pulse source for producing a train of optical pulses;
   an amplitude tunable filter (ATF) adapted to optically map the amplitude information of the analog signal to wavelength information by impressing on the train of optical pulses spectral changes induced by the amplitude information of the analog signal;
   a dispersive element adapted to optically map the wavelength information to temporal information by broadening the train of optical pulses in the time domain received from the ATF to produce a train of optical pulses encoded with the temporal information in the time domain;

an optical-to-electrical converter adapted to convert the train of optical pulses from the dispersive element to a train of electrical waveforms encoded with the temporal information in the time domain;

an analog-to-digital converter (ADC) adapted to digitize the train of electrical waveforms from the optical-to-electrical converter into a digital image and resolve the temporal information in the time domain; and a digital signal processor (DSP) for digital signal processing the digital image using the resolved temporal information to produce a digital reconstruction of the analog signal.

2. The system of claim 1, wherein the ATF is a periodic ATF so that the amplitude-to-time optical mapping occurs over multiple periods, and further comprising: a signal attenuator, an amplifier for amplifying the analog signal before passing to both the periodic ATF and the signal attenuator, and a second ADC adapted to digitize an attenuated analog signal from the attenuator, wherein the signal attenuator attenuates the signal for amplitude-to-time optical mapping over a single period.

3. The system of claim 2, further comprising: a continuous laser source, an optical amplitude modulator arranged to receive a continuous wave laser beam from the continuous laser source and the attenuated analog signal from the attenuator, an optical-to-electrical converter arranged to receive input from the optical amplitude modulator and to direct output to the second ADC.

4. The system of claim 2, further comprising: a second ATF arranged to receive a copy of the train of optical pulses from the optical pulse source and the attenuated signal from the signal attenuator, a second dispersive element arranged to receive input from the second ATF, and an optical-to-electrical converter arranged to receive input from the optical amplitude modulator and to direct output to the second ADC.

5. The system of claim 1, further comprising at least one additional set of: a dispersive element adapted to optically map the wavelength information to temporal information by broadening the train of optical pulses in the time domain received from the ATF to produce a train of optical pulses encoded with the temporal information in the time domain; an optical-to-electrical converter adapted to convert the train of optical pulses from the dispersive element to a train of electrical waveforms encoded with the temporal information in the time domain; and an ADC adapted to digitize the train of electrical waveforms from the optical-to-electrical converter into a digital image and resolve the temporal information in the time domain, wherein each set of dispersive element optical-to-electrical converter, and analog-to-digital converter is a channel; and further comprising a time de-multiplexor arranged to time de-multiplex the train of optical pulses from the ATF into at least two train subsets corresponding to a total number of channels, and to pass the train subsets to the channels for resolving the temporal information in the time domain, and wherein the DSP processes the digital images from all channels using the resolved temporal information to produce a digital reconstruction of the analog signal.

6. A method of digitizing an analog signal based on analog-to-time optical mapping, comprising:

converting an analog signal into a train of amplitude-to-time optically mapped analog waveforms each encoded with temporal information representing amplitude information of the analog signal;

digitizing the train of temporal information-encoded analog waveforms into a digital image to resolve the temporal information in the time domain; and digital signal processing the digital image using the resolved temporal information to produce a digital reconstruction of the analog signal.

7. The method of claim 6, wherein the step of converting the analog signal into the train of amplitude-to-time optically mapped analog waveforms comprises: using an amplitude tunable filter (ATF) to optically map the amplitude information of the analog signal to wavelength information by impressing on a train of optical pulses spectral changes induced by the amplitude information of the analog signal; and using a dispersive element to optically map the wavelength information to temporal information by broadening the train of optical pulses from the ATF into a train of optical pulses encoded with the temporal information in the time domain.

8. The method of claim 7, wherein the step of digitizing the train of temporal information-encoded analog waveforms into a digital image to resolve the temporal information in the time domain comprises: using an optical-to-electrical converter to convert the train of temporal information-encoded optical pulses to a train of temporal information-encoded electrical waveforms; and using an ADC to digitize the a train of temporal information-encoded electrical waveforms into the digital image.

9. The method of claim 8, wherein the ATF is a periodic ATF so that the amplitude-to-time optical mapping of the analog waveforms occurs over multiple periods, further comprising: converting an attenuated copy of the analog signal into a second train of amplitude-to-time optically mapped analog waveforms each encoded with temporal information representing amplitude information of the analog signal, so that the amplitude-to-time optical mapping of the analog waveforms occurs over a single period; digitizing the second train of temporal information-encoded analog waveforms into a second digital image to resolve the temporal information in the time domain; and wherein the step of digital signal processing processes the first and second digital images together using the resolved temporal information to produce a digital reconstruction of the analog signal.

10. The method of claim 6, wherein the analog signal is converted into multiple time de-multiplexed trains of amplitude-to-time optically mapped analog waveforms each encoded with temporal information representing amplitude information of the analog signal; and wherein each time de-multiplexed train of temporal information-encoded analog waveforms is digitized into a digital image to resolve the temporal information in the time domain; and wherein all of the digital images are digital signal processed together to interleave and reconstruct the analog signal.

* * * * *